United States Patent
Rundle

(10) Patent No.: US 8,005,260 B2
(45) Date of Patent: Aug. 23, 2011

(54) CORRECTING VIDEO CODING ERRORS USING AN AUTOMATIC RECOGNITION RESULT

(75) Inventor: Alfred T. Rundle, Endwell, NY (US)

(73) Assignee: Graham Packaging Company L.P., York, PA (US)

( * ) Notice: Subject to any disclaimer, the term of this patent is extended or adjusted under 35 U.S.C. 154(b) by 744 days.

(21) Appl. No.: 12/120,891

(22) Filed: May 15, 2008

(65) Prior Publication Data

US 2009/0285447 A1     Nov. 19, 2009

(51) Int. Cl.
*G06K 9/00* (2006.01)
*G06K 9/36* (2006.01)
*G06K 8/46* (2006.01)

(52) U.S. Cl. ........ 382/101; 382/102; 382/104; 382/232; 209/584

(58) Field of Classification Search ........... 382/101, 382/102, 104, 232; 209/584
See application file for complete search history.

(56) References Cited

U.S. PATENT DOCUMENTS

| | | | |
|---|---|---|---|
| 5,617,481 A | 4/1997 | Nakamura | |
| 5,910,998 A | 6/1999 | Yui | |
| 6,269,171 B1 * | 7/2001 | Gozzo et al. | 382/101 |

(Continued)

FOREIGN PATENT DOCUMENTS

DE    197 07 397 A1    8/1998

(Continued)

OTHER PUBLICATIONS

A. Benedetti et al., "Confidence computation improvement in an optical field reading system: Abstract", Fourth International Conference Document Analysis and Recognition, ICDAR '97, p. 836.

(Continued)

*Primary Examiner* — Andrew W Johns
*Assistant Examiner* — Shefali D Goradia
(74) *Attorney, Agent, or Firm* — Miles & Stockbridge P.C.; James T. Carmichael; Stephen W. Aycock, II

(57) ABSTRACT

A method for sorting mail includes performing an automatic address recognition process on a digitized image of a mail piece and generating a plurality of conditional address recognition results and a plurality of confirmation values each associated with one of the plurality of conditional address recognition results. The method can include sending the digitized image, the plurality of conditional address recognition results and the plurality of confirmation values to a video coding system. The method can include detecting a possible error in a first video coding result, the possible error detected using error correction information including information from the automatic address recognition process. The method may include indicating the possible error to a video coding operator, and performing a video coding operation to obtain a second video coding result and arbitrating or selecting one of the results as output.

20 Claims, 9 Drawing Sheets

U.S. PATENT DOCUMENTS

| | | | |
|---|---|---|---|
| 6,327,373 B1 * | 12/2001 | Yura | 382/101 |
| 6,535,619 B1 | 3/2003 | Suwa et al. | |
| 6,587,572 B1 | 7/2003 | Suchenwirth-Bauersachs et al. | |
| 6,741,724 B1 * | 5/2004 | Bruce et al. | 382/101 |
| 6,909,789 B1 | 6/2005 | Hänsel et al. | |
| 7,215,794 B2 * | 5/2007 | Fuhrmann et al. | 382/101 |
| 7,925,046 B2 * | 4/2011 | Rundle et al. | 382/101 |
| 2003/0044044 A1 | 3/2003 | Emanuelsson et al. | |
| 2004/0059462 A1 | 3/2004 | Norris et al. | |
| 2004/0120547 A1 | 6/2004 | Mampe et al. | |
| 2004/0146181 A1 | 7/2004 | Hänsel et al. | |
| 2005/0123170 A1 | 6/2005 | Desprez et al. | |
| 2005/0180661 A1 * | 8/2005 | El Bernoussi et al. | 382/317 |
| 2005/0249376 A1 * | 11/2005 | Leo et al. | 382/101 |

FOREIGN PATENT DOCUMENTS

| | | |
|---|---|---|
| DE | 197 48 702 C1 | 11/1998 |
| JP | 9-161003 | 6/1997 |
| JP | 2000-262986 | 9/2000 |
| JP | 2003-300021 | 10/2003 |
| WO | WO 2004/027673 A1 | 4/2004 |

OTHER PUBLICATIONS

"Distribution Technology in the Postal Service Past, Present and Future"; source: http:www.treasury.gov/offices/domestic-finance/usps/testimony-docs/Day.pdf, Mar. 13, 2003, pp. 1-12.

* cited by examiner

CORRECTING VIDEO CODING ERRORS USING AN AUTOMATIC RECOGNITION RESULT

Embodiments of the present invention relate generally to automated mail sorting and, more particularly, to correcting video coding errors using an automatic address recognition result.

Conventional automated mail sorting equipment may include an automatic address recognition system for reading addresses contained in mail piece images. If the automatic address recognition system is unable to resolve a destination address from a mail piece image, the automatic address recognition system may reject the mail piece image. Mail piece images rejected by the automatic address recognition system may be sent to a video coding system (VCS), in which one or more human operators manually resolves a destination address and/or other information contained in the rejected mail piece images. In some systems, the VCS may return a "hint", such as a ZIP code or a partial address string for use by the automatic address recognition system. The hint and the rejected mail piece image may be provided as input to the automatic address recognition system so that the automatic address recognition system may be re-dispatched for a second attempt to resolve the destination address contained in a rejected mail piece image.

The re-dispatching of the automatic address recognition process may represent a limitation of conventional systems and may result in processing inefficiencies, increased computation cost, and/or increased processing latency, which may impact the timeliness of online address resolution. Also, sending rejected mail piece images from the automatic address recognition system to the VCS in order to generate hints may entail a special task for a VCS operator. Handling of this special task may include dedicating a portion of the labor resources in a VCS to the special task or interrupting a normal task workflow of a VCS operator to handle the special task. Interrupting the VCS operator with the special task may reduce VCS operator productivity and may increase training costs because the normal workload and rhythm may be interrupted by having to intermittently switch tasks.

Also, errors may be introduced during the video coding operation. Embodiments of the present invention may address the above-mentioned problems and limitations, among other things. For example, the present inventor has determined that some errors introduced during a videocoding operation can be identified using information obtained during a previous automatic address recognition process.

An embodiment can include a method for sorting mail. The method includes performing an automatic address recognition process on a digitized image of a mail piece and generating a plurality of conditional address recognition results and a plurality of confirmation values each associated with one of the plurality of conditional address recognition results. The method can include sending the digitized image, the plurality of conditional address recognition results and the plurality of confirmation values to a video coding system to have a first video coding operation performed. The method may also include detecting a possible error in a first video coding result as the first video coding result is being formed by a video coding operator, the possible error detected using error correction information including information from the automatic address recognition process. The method may include indicating the possible error to a video coding operator, and performing a second video coding operation to obtain a second video coding result. The second video coding result can be the same as or different from the first video coding result having the possible error. The method can also include arbitrating between the first video coding result, the second video coding result and an automatic address recognition result. Based on the arbitration, it can be determined whether to provide the first video coding result, the second video coding result, or the automatic address recognition result as output. Or, an additional video coding operation or automatic address recognition process may be initiated based on the arbitration.

In another embodiment, a mail sorting system can include an automatic address recognition module and a video coding system coupled to the automatic address recognition module, the video coding system receiving a conditional result and a confirmation value generated by the automatic address recognition module. The automatic address recognition module can include a memory having encoded thereon software instructions that when executed cause the address recognition system to perform a series of steps. The steps can include performing an automatic address recognition process on a digitized image of a mail piece and generating a conditional address recognition result and a confirmation value associated with the conditional address recognition result. The steps can also include sending the conditional address recognition result and the confirmation value to the video coding system.

The video coding system includes a memory having software instructions encoded thereon that when executed cause the video coding system to perform a series of steps. The steps can include detecting a possible error in a video coding result as the video coding result is being formed by a video coding operator, the possible error detected using error correction information including information from the automatic address recognition process; and indicating the possible error to a video coding operator.

Another embodiment includes a computer program product including software instructions for enabling a computer to perform predetermined operations; and a computer readable medium bearing the software instructions. The predetermined operations including the steps of performing an automatic address recognition process on a digitized image of a mail piece and generating a conditional address recognition result and a confirmation value associated with the conditional address recognition result on the basis of an uncertain result from the automatic address recognition process. The steps also can include sending the conditional address recognition result and the confirmation value to a video coding system, detecting a possible error in a video coding result, and indicating the possible error to a video coding operator.

DETAILED DESCRIPTION

In general, at least one embodiment can resolve an address from a low confidence automatic recognition result using implicit video coding confirmation. The term "implicit video coding confirmation," as used herein, refers to sending one or more conditional automatic address recognition results and one or more corresponding confirmation values to a video coding system for confirmation. The confirmation is termed "implicit" because confirmation values, used by software to confirm a conditional result, may be provided along with the conditional results and the confirmation of the conditional result can be transparent to a video coding operator. Based on a comparison of a result of video coding and a confirmation value, software can automatically resolve the address, which can include one of the conditional results that corresponds to the confirmation value, without a need for additional video coding tasks or re-dispatching an automatic address recognition system task. Because standard video coding tasks (as opposed to special tasks) can be used for confirmation, embodiments can be incorporated relatively easily into an existing mail sorting apparatus having an automatic address recognition system and a video coding system.

The exemplary VCS described in conjunction with the various embodiments below may include a sequential address coding sequence including last line coding and street coding. Last line coding can include resolving an address to a 5-digit ZIP code, for example by an operator keying (or otherwise coding, for example, using a mouse or a speech recognition system) the 5-digit ZIP code and/or a portion of the locality, or city, text. Street coding can include resolving the address to a finer depth such as mail carrier walk route or delivery point, for example by an operator coding range (e.g., house number) characters and a portion of the street name. The exemplary VCS can also have a region of interest (ROI) coding task, which may include an operator using a mouse to identify coordinates of the address block in the mail piece image. ROI identification may also be accomplished through by an operator using a mouse to select an upper left corner of an address block and dragging a cursor to a lower right corner of the block. Also, ROI identification may be accomplished by having highlighted blocks on a screen from which an operator selects one using a mouse. Alternatively, the highlighted blocks may be numbered and an operator may select one by keying/coding in the corresponding number associated with the block being selected.

Figure 1:
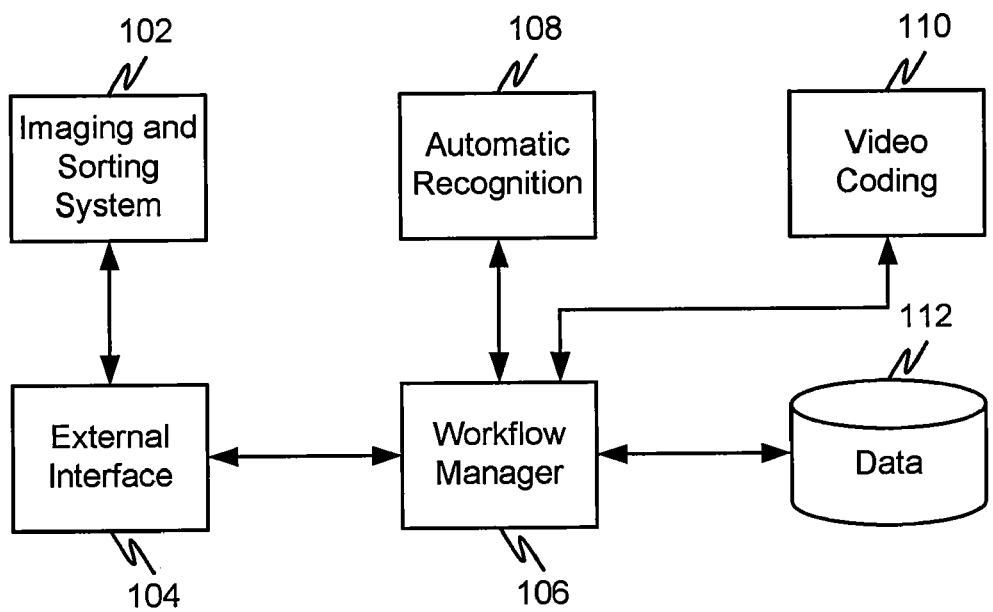
FIG. 1 provides a block diagram illustration of an exemplary mail sorting system including an automatic address recognition system with implicit video coding confirmation in accordance with at least one embodiment.

FIG. 1 provides a block diagram illustration of an exemplary mail sorting system including an automatic address recognition system with implicit video coding confirmation in accordance with at least one embodiment. In particular, a mail sorting system 100 can include an imaging and sorting system 102, an external interface 104, a workflow manager 106, an automatic recognition unit 108, a video coding system 110, and a database 112.

The imaging and sorting system 102 can include the electronics and machinery used to transport mail pieces, generate an image of each mail piece, and sort each mail piece according to its destination or other criteria. For example, the imaging and sorting system 102 can be used to generate an image of a mail piece. The image may be received by the external interface 104, which can provide an interface between the workflow manager 106 and the imaging and sorting system 102. The image may be received by the workflow manager 106 and sent to the automatic recognition unit 108. The automatic recognition unit 108 may attempt automatically to recognize information in the mail piece image, such as destination address, return address, postage, barcodes, and/or other information.

If the automatic recognition unit 108 has difficulty reading a portion of the mail piece image, for example, the destination address, then the image may be sent to the video coding system 110 along with one or more conditional results and associated confirmation values. The automatic recognition unit 108 may communicate with the video coding system 110 either indirectly (through the workflow manager 106) or directly. Software in the video coding system 110 or the workflow manager 106 can be used to confirm a conditional result. Once a conditional result is confirmed, the processing of the mail piece may continue without a need to repeat automatic recognition or a need to perform further video coding tasks.

The video coding system 110 can include human operators that view an image and enter some or all of the information contained in the image. The video coding results may then be used to confirm a conditional result, which may then be used to resolve any ambiguity or uncertainty regarding the destination address, or other information in the mail piece image. Data generated by the automatic recognition processes and video coding processes may be stored in the database 112.

Figure 2:
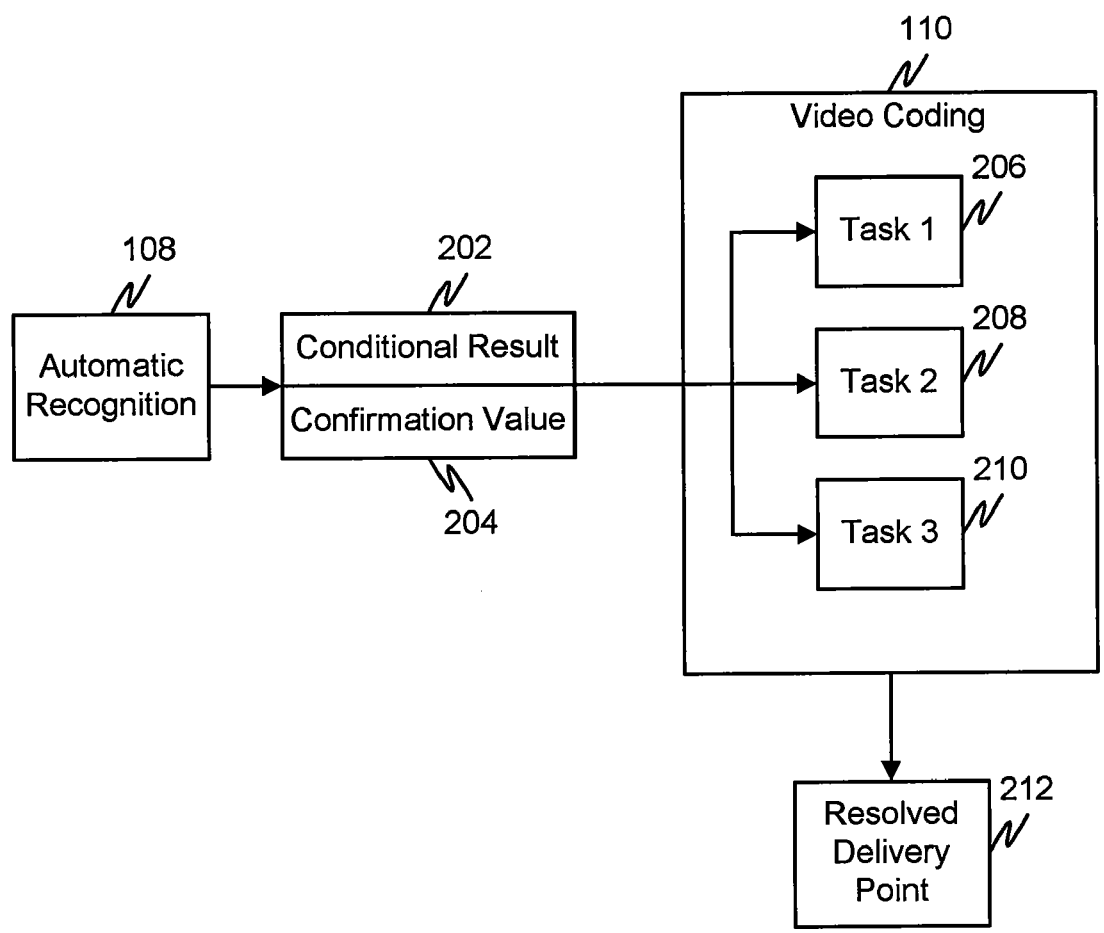
FIG. 2 provides a block diagram illustration of an exemplary automatic address recognition system and video coding system in accordance with at least one embodiment.

FIG. 2 provides a block diagram illustration of an exemplary automatic address recognition system and video coding system in accordance with at least one embodiment. In particular, the automatic recognition unit 108, while attempting address recognition on a mail piece image, may encounter some uncertainty. The automatic recognition unit can send a conditional result 202 and an associated confirmation value 204 to the video coding system 110, along with the mail piece image.

The video coding system may include a plurality of operators performing certain tasks (206-210). The image and conditional result/confirmation value may be directed to a video coding task that corresponds to the portion of the address that the automatic recognition unit 108 had trouble resolving. By sending a mail piece image (not shown) and a conditional result 202/confirmation value 204 to a selected video coding task (206, 208, and/or 210), the video coding system may be able to resolve an ambiguity or uncertainty from the automatic recognition process and generate, for example, a resolved delivery point 212. A level of resolution to a depth of sort other than delivery point, such as, for example, mail carrier or walk route, could be generated. If the video coding system is not able to confirm a conditional result, then full video coding may be used to resolve an uncertainty.

Figure 3:
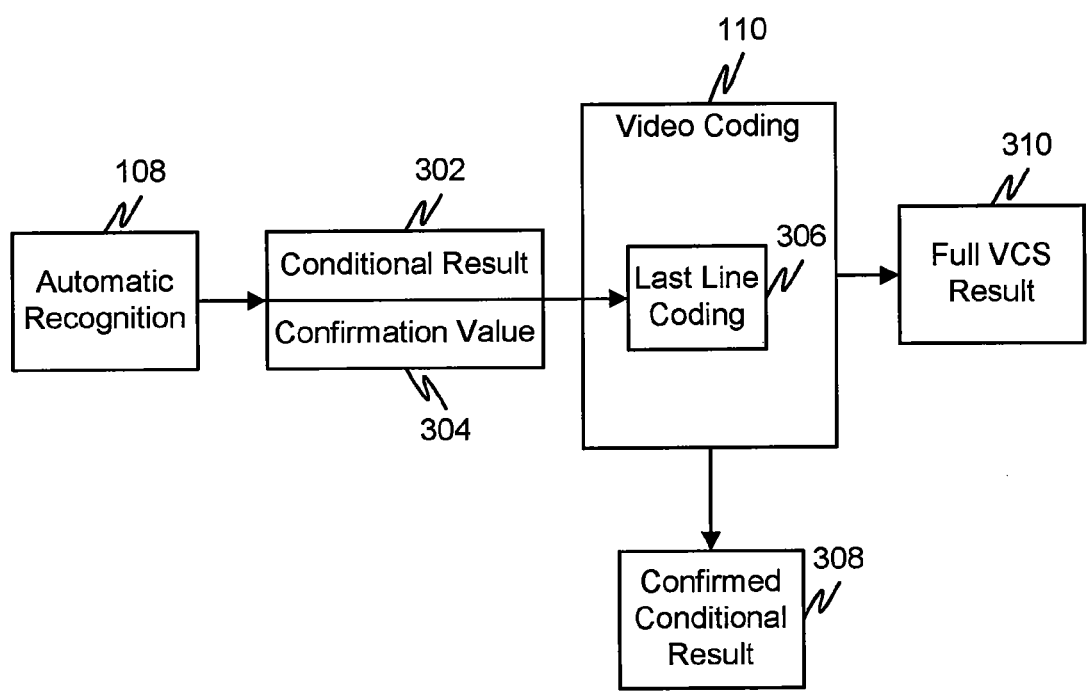
FIG. 3 provides a block diagram illustration of a dataflow in an exemplary embodiment including a single conditional result and corresponding confirmation value.

FIG. 3 provides a block diagram illustration of a dataflow in an exemplary embodiment including a single conditional result and corresponding confirmation value. In particular, the automatic recognition unit 108, while attempting address recognition on a mail piece image, may encounter some uncertainty. The automatic recognition unit 108 can send a conditional result 302 and an associated confirmation value 304 to the video coding system 110, along with the mail piece image (not shown). In this example, the video coding system 110 includes a last line coding task 306. The video coding system 110, after processing as described below, may output as a result a confirmed conditional result 308 or a full video coding system (VCS) result 310.

For example, the automatic recognition system 108 may have processed two address blocks in the mail piece image, but may be uncertain as to which is the destination address block. The automatic recognition unit may have a first choice for the destination address having a delivery point ZIP code of 13760-1537-26. The second choice may have only been resolved to a 5-digit ZIP such as 13827. Thus, the automatic recognition unit 108 may send a conditional result having a value of 13760-1537-26 and a confirmation value of 13760 to the video coding system with a request for "Full Address Coding," the first step of which is last-line coding 306. The video coding operator performing the last line coding task may enter the 5-digit zip code as the first step. The system may then compare the video coding result, for example 13760, to the confirmation value. If the two match, then no further video coding is necessary because the conditional result from the automatic recognition system identified the destination down to an 11-digit delivery point code. By matching the confirmation value, the video coder has in effect confirmed the first choice of the automatic recognition unit 108. Thus, no further keystrokes by the video coding operator may be needed and no further automatic recognition may be needed. The mail piece image can then be removed from the video coding workflow and sorted according to the confirmed conditional result 308.

However, if the video coder had entered a result that did not match the confirmation value, for example 13827, the video coding process may continue as normal with a street coding step in order to complete resolution of the address and a full video coding system result 310 may be output as the resolved address. Optionally, automatic recognition may be re-dispatched using the 5-digit ZIP from last line coding as a hint.

Figure 4:
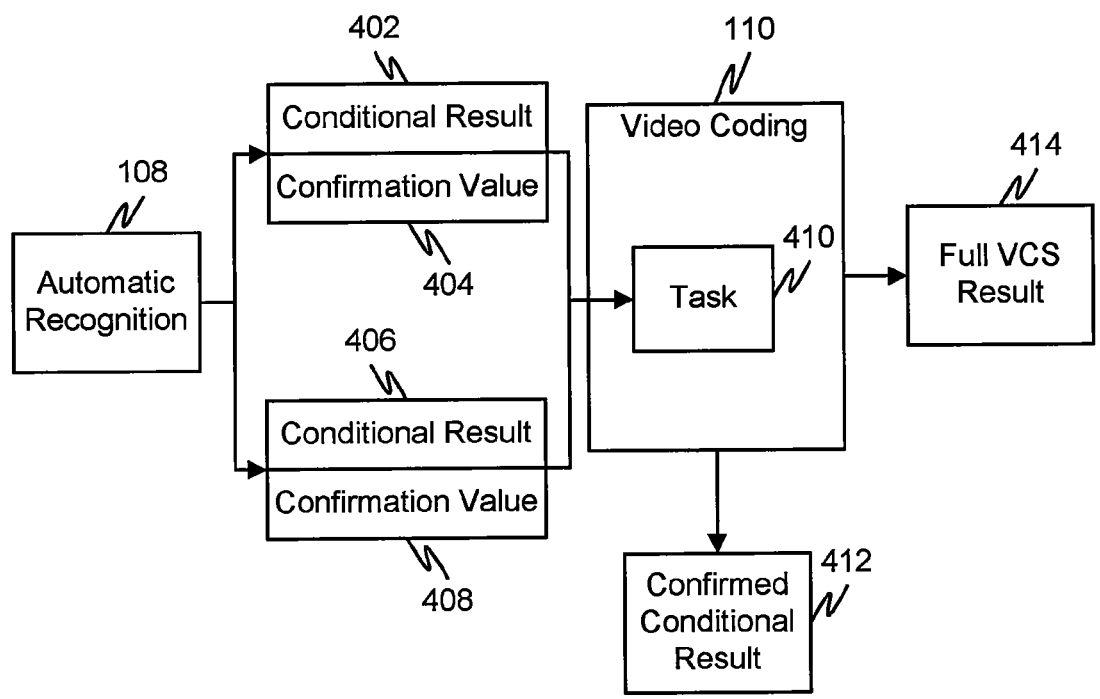
FIG. 4 provides a block diagram illustration of a dataflow in an exemplary embodiment including multiple conditional results and corresponding confirmation values.

FIG. 4 provides a block diagram illustration of a dataflow in an exemplary embodiment including multiple conditional results and corresponding confirmation values. In particular, the automatic recognition unit 108, while attempting address recognition on a mail piece image, may encounter some uncertainty. The automatic recognition unit 108 can send a plurality of conditional results including a first conditional result 402 and an associated first confirmation value 404, and a second conditional result 406 and an associated second confirmation value 408, to the video coding system 110, along with the mail piece image (not shown) for confirmation. In this example, the video coding system 110 includes a task 410. The video coding system 110, after processing as described below, may output as a result a confirmed conditional result 412 or a full video coding system (VCS) result 414.

For example, the automatic recognition unit 108 may have uncertainty regarding which of two address blocks in a mail piece image is the destination address block. The automatic recognition unit 108 may have resolved both address blocks to their respective delivery point codes (or other depth of sort criteria) and can present both delivery point codes to the video coding system as conditional results (402 and 406). For example, the first conditional result 402 could be 13760-1537-26 and have an associated first confirmation value of 13760; and the second conditional result could be 13827-3998 and have an associated confirmation value of 13827.

If a result of the last line coding task 410 in the video coding system 110 is either 13760 or 13827, then software can select the associated conditional result as the delivery point and no further video coding or automatic recognition may be needed.

If, however, the video coding result was other than one of the two conformation values, then the normal video coding process may continue to produce a full video coding result 414, or automatic recognition may be re-dispatched using a hint from the video coder.

Figure 5:
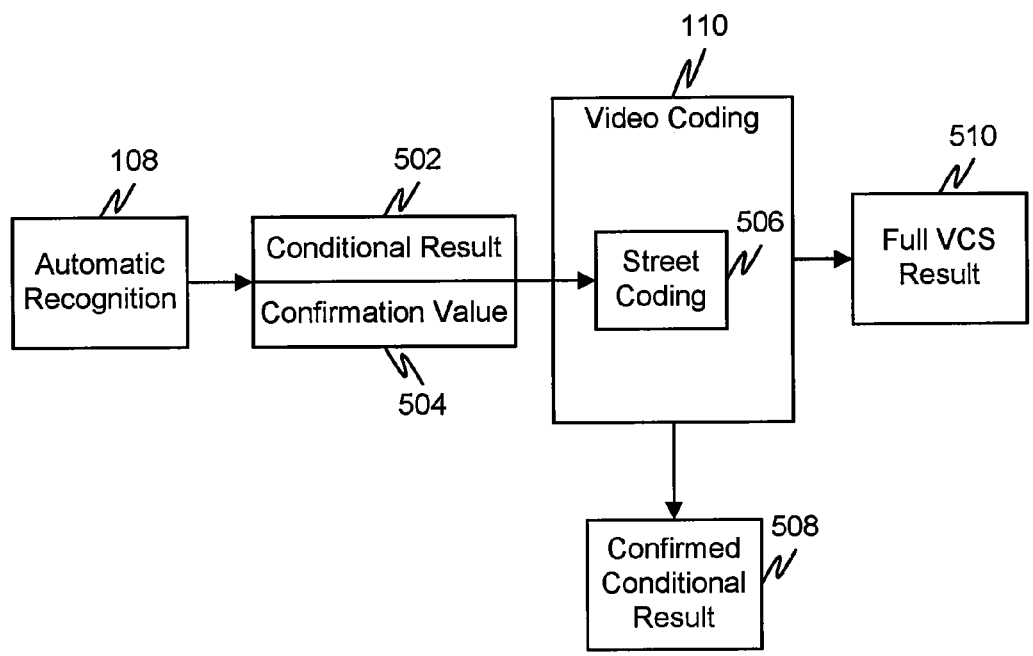
FIG. 5 provides a block diagram illustration of a dataflow in an exemplary embodiment including a single conditional result and corresponding confirmation value.

FIG. 5 provides a block diagram illustration of a dataflow in an exemplary embodiment including a single conditional result and corresponding confirmation value. In particular, the automatic recognition unit 108, while attempting address recognition on a mail piece image, may encounter some uncertainty. The automatic recognition unit 108 can send a conditional result 502 and an associated confirmation value 504 to the video coding system 110, along with the mail piece image (not shown). In this example, the video coding system 110 includes a street coding task 506. The video coding system 110, after processing as described below, may output as a result a confirmed conditional result 508 or a full video coding system (VCS) result 510.

For example, the automatic recognition system 108 may have achieved a low confidence candidate primary delivery address based on weak confidence in a building number and/or street name. However, the automatic recognition unit 108 has achieved a high confidence on the interpretation of the top line of the address (e.g. apartment number, suite, firm name, individual name, or the like) based on the candidate primary delivery address. The address can be resolved to a finer depth of sort by using video coding to confirm building and street number. For example, the conditional result may be a finest depth firm name result such as 13827-3998 with an associated confirmation value of 13827-3900-01. Thus, the automatic recognition unit 108 may send a conditional result having a value of 13827-3998 and a confirmation value of 13827-3900-01 (a non-finest depth street name result) to the video coding system with a request for "Street Coding" 506. The video coding operator performing the street coding task may enter the building number and/or street name. The system may then generate a resulting ZIP code and compare the ZIP code to the confirmation value. If the two match, then no further video coding is necessary because the conditional result from the automatic recognition system identified the destination down to an 11-digit delivery point code (or other depth of sort). Thus, no further keystrokes by the video coding operator may be needed and no further automatic recognition may be needed. The mail piece image can then be removed from the video coding workflow and sorted according to the confirmed conditional result 508.

However, if the video coder had entered a result that did not match the confirmation value, for example 13827-3900-03, the video coding process may continue as normal with a street coding step in order to complete resolution of the address and a full video coding system result 510 may be output as the resolved address. Optionally, automatic recognition may be re-dispatched using the 5-digit ZIP from last line coding as a hint.

Figure 6:
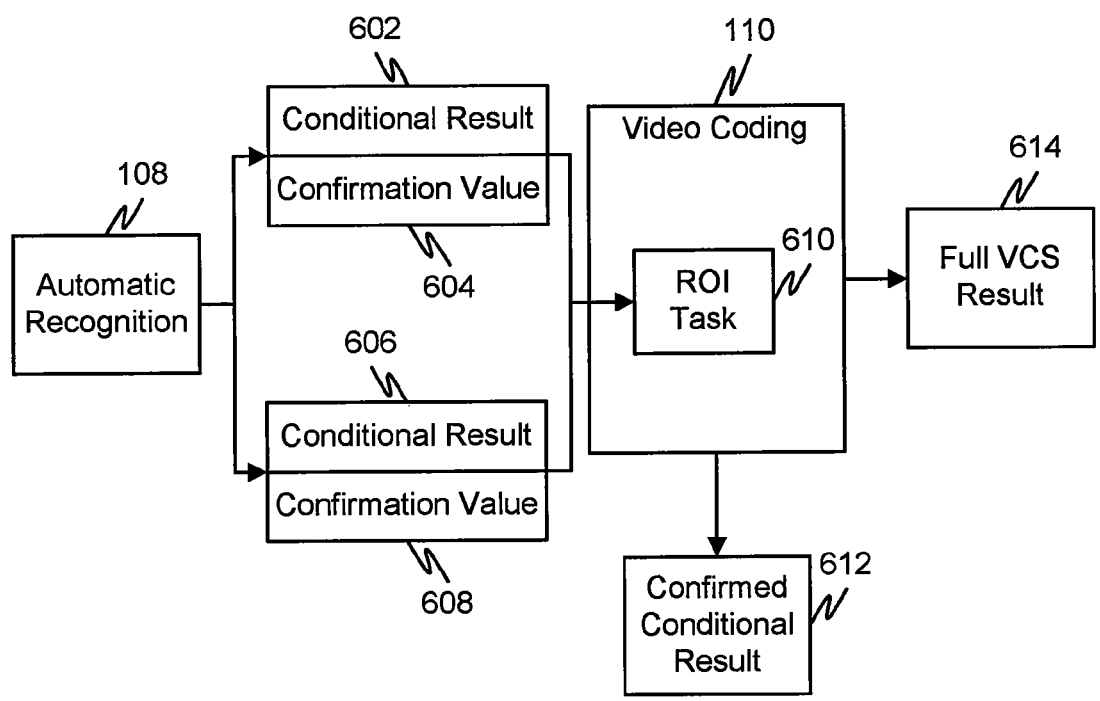
FIG. 6 provides a block diagram illustration of a dataflow in an exemplary embodiment including multiple conditional results and corresponding confirmation values.

FIG. 6 provides a block diagram illustration of a dataflow in an exemplary embodiment including multiple conditional results and corresponding confirmation values. In particular, the automatic recognition unit 108, while attempting address recognition on a mail piece image, may encounter some uncertainty. The automatic recognition unit 108 can send a plurality of conditional results including a first conditional result 602 and an associated first confirmation value 604, and a second conditional result 606 and an associated second confirmation value 608, to the video coding system 110, along with the mail piece image (not shown) for confirmation. In this example, the video coding system 110 includes a region of interest (ROI) task 610. The video coding system 110, after processing as described below, may output as a result a confirmed conditional result 612 or a full video coding system (VCS) result 614.

For example, the automatic recognition unit 108 may have resolved an address from each of two address blocks in a mail piece image, but may be uncertain as to which is the destination address block. The automatic recognition unit 108 may send a ZIP code of 13760-1537-26 as the first conditional result 602 and coordinates of X1, Y1, X2, Y2 as the first confirmation value 604; and a ZIP code of 13827-3998 as the second conditional result 606 and coordinates of X3, Y3, X4, Y4 as the second confirmation value 608. The automatic recognition unit 108 may request an ROI task 610 from the video coding system 110.

If the ROI task 610 result coordinates match, within a tolerance, those of either confirmation value coordinates, then the conditional result associated with the matching coordinates can be output as the confirmed conditional value. If, however, the video coding result was does not match one of the two conformation values, then the normal video coding process may continue to produce a full video coding result 614, or automatic recognition may be re-dispatched using a hint from the video coder, such as the coordinates of the destination address block as identified by the video coding task 610.

Figure 7:
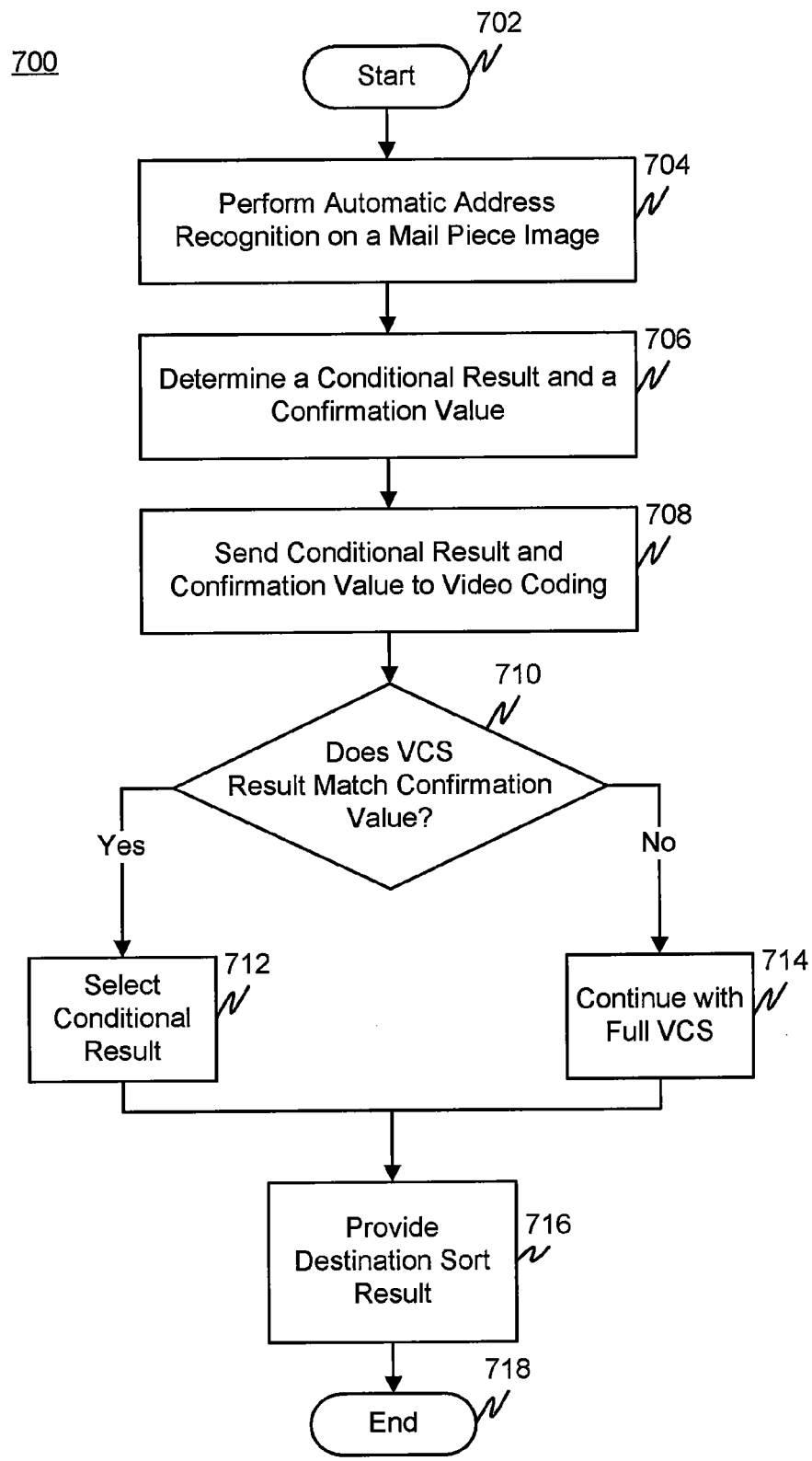
FIG. 7 provides a flowchart of an exemplary method of automatic address recognition with implicit video coding confirmation in accordance with at least one embodiment.

FIG. 7 provides a flowchart 700 of an exemplary method of automatic address recognition with implicit video coding confirmation in accordance with at least one embodiment. Processing begins at step 702 and continues to 704.

In step 704, automatic address recognition is attempted on a mail piece image. The automatic recognition process may result in some ambiguity or uncertainty, such as resolving a destination address to a delivery point code or a carrier walk depth. Control continues to step 706.

In step 706, a conditional result and a confirmation value associated with the conditional result are determined. For example, the conditional result may comprise a delivery point code and the confirmation value can include a 5-digit ZIP code. It should be appreciated that more than one pair of conditional results and associated confirmation values may be used. Control continues to step 708.

In step 708, the conditional result and associated confirmation value are sent to video coding for confirmation. The mail piece image can also be sent to video coding for use in confirming the conditional result. Control continues to step 710.

In step 710, a result from the video coding system (VCS) is compared to the confirmation value. If the VCS result matches the confirmation value, then control continues to step 712. If, however, the VCS result does not match the confirmation value, then control continues to step 714.

In step 712, the conditional result is confirmed and selected as the result of the task. For example, if the video coder codes a sequence matching a 5-digit ZIP confirmation value, then a conditional result including a delivery point code associated with the confirmation value may be selected as the result. The mail piece may then be sorted according to the confirmed conditional value. It should be appreciated that sortation to depths other than delivery point may be used, such as, for example, carrier walk route. Control continues to step 716.

In step 714, the video coding sequence may continue and a video coding process result, for example, a delivery point code, may be output. Control continues to step 716.

In step 716, the destination sort result, such as delivery point code, from confirmation of automatic recognition results or of the full VCS process may be provided for mail sorting. Control continues to step 718 where the sequence ends.

It should be appreciated that steps 702-718 may be repeated in whole or in part in order to perform a contemplated mail sorting task. Further, it should be appreciated that the steps mentioned above may be performed on a single or distributed processor. Also, the processes, modules, and units described in the various figures of the embodiments above may be distributed across multiple computers or systems or may be co-located in a single processor or system.

Figure 8:
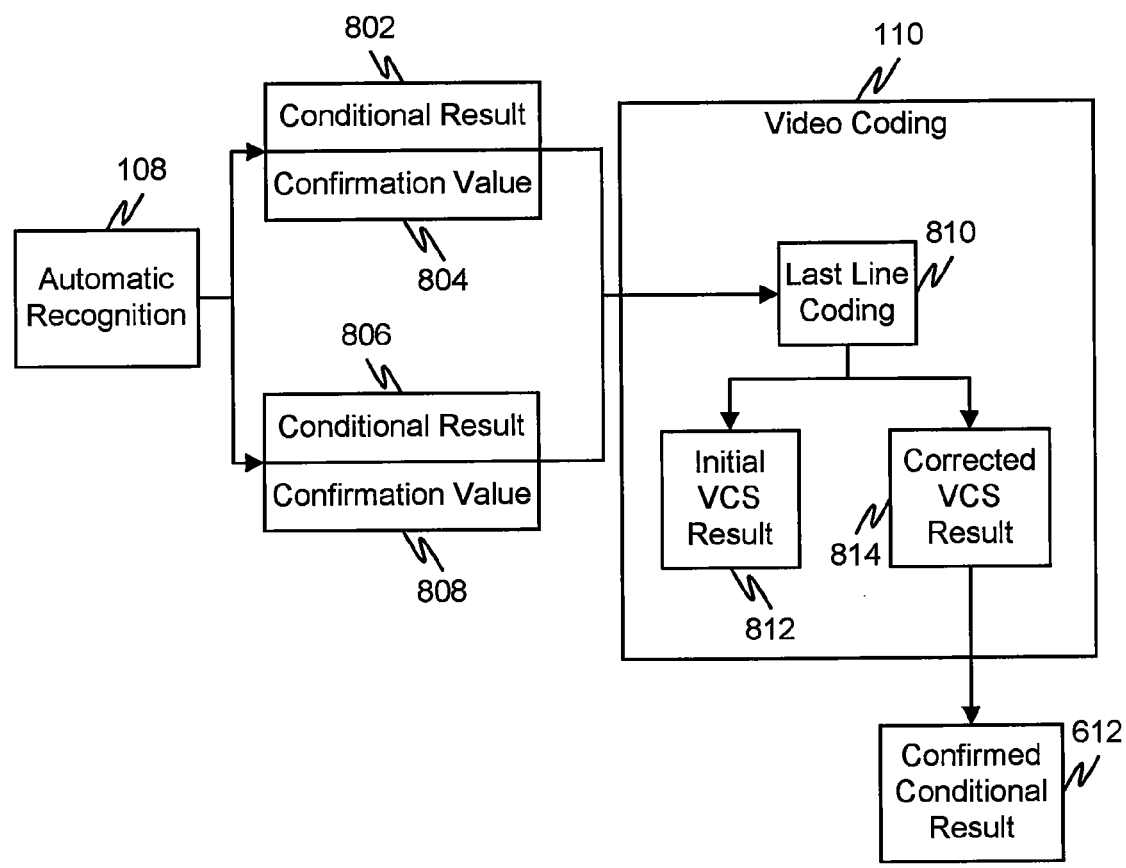
FIG. 8 provides a block diagram illustration of a dataflow in an exemplary embodiment in which a video coding error is identified and corrected using an automatic address recognition result.

FIG. 8 provides a block diagram illustration of a dataflow in an exemplary embodiment in which a video coding error is identified and corrected using an automatic address recognition result. In particular, the automatic recognition unit 108, while attempting address recognition on a mail piece image, may encounter some uncertainty. The automatic recognition unit 108 can send a plurality of conditional results including a first conditional result 802 and an associated first confirmation value 804, and a second conditional result 806 and an associated second confirmation value 808, to the video coding system 110, along with the mail piece image (not shown) for confirmation. In this example, the video coding system 110 includes a last line coding task 810. The video coding system 110, may output as a result an initial VCS result 812. The initial VCS result 812 may be a partial result generated during the progression of the video coding task or a final result of the video coding task.

The video coding system may use a portion of the confirmation values (804 and/or 808) to validate the initial VCS result 812. If the initial VCS result 812 does not correlate with the portion of the confirmation values used to validate it, the video coding task may be repeated to generate a corrected VCS result 814. The corrected VCS result 814 may be output as a confirmed conditional result 816.

Alternatively to, or in conjunction with, the repeated video coding task, the video coding system may attempt automatically to correct the initial VCS result 812 using the portion of confirmation values, or another portion of the confirmation values not used for validation.

The video coding system or other system can select an output by arbitrating between the first video coding result, the second video coding result and an automatic recognition result. The arbitrating can be used to determine whether to select one of the first video coding result, the second video coding result and the automatic recognition result as an output. The arbitrating can also be used to determine whether to perform an additional video coding operation or automatic address recognition operation on the image. The result arbitration can be based on respective confidence values of the various results, comparison with internal or external data sources (e.g., ZIP code or address database), other information source suitable for determining which result to output, or a combination of the above.

For example, the automatic address recognition system may have identified the destination and return address blocks with fairly high confidence, but is unable to read the last line of the destination address block. So, the system has fairly high confidence about which address block is the destination and it has fairly high confidence about the last line of the return address block. As the video coding task is proceeding for the last line keying of the destination address block, if the system detects the video coding operator coding the last line of the return address, then the system could alert the operator to a possible error in the video coding. The video coding could be repeated in order to correct the possible error. Or, the operator could continue with the video coding, if, for example, the operator perceives that the possible error is not an actual error.

The system could suggest the nature of the error if known. For example, the system could suggest that the operator is coding the return address instead of the destination address. Alternatively, the system could attempt to correct the error if enough information were available. In another alternative, the system could provide a pick list to a video coding operator based on the possible error detected and offer alternatives to the operator to select from if enough information were available to do so.

Figure 9:
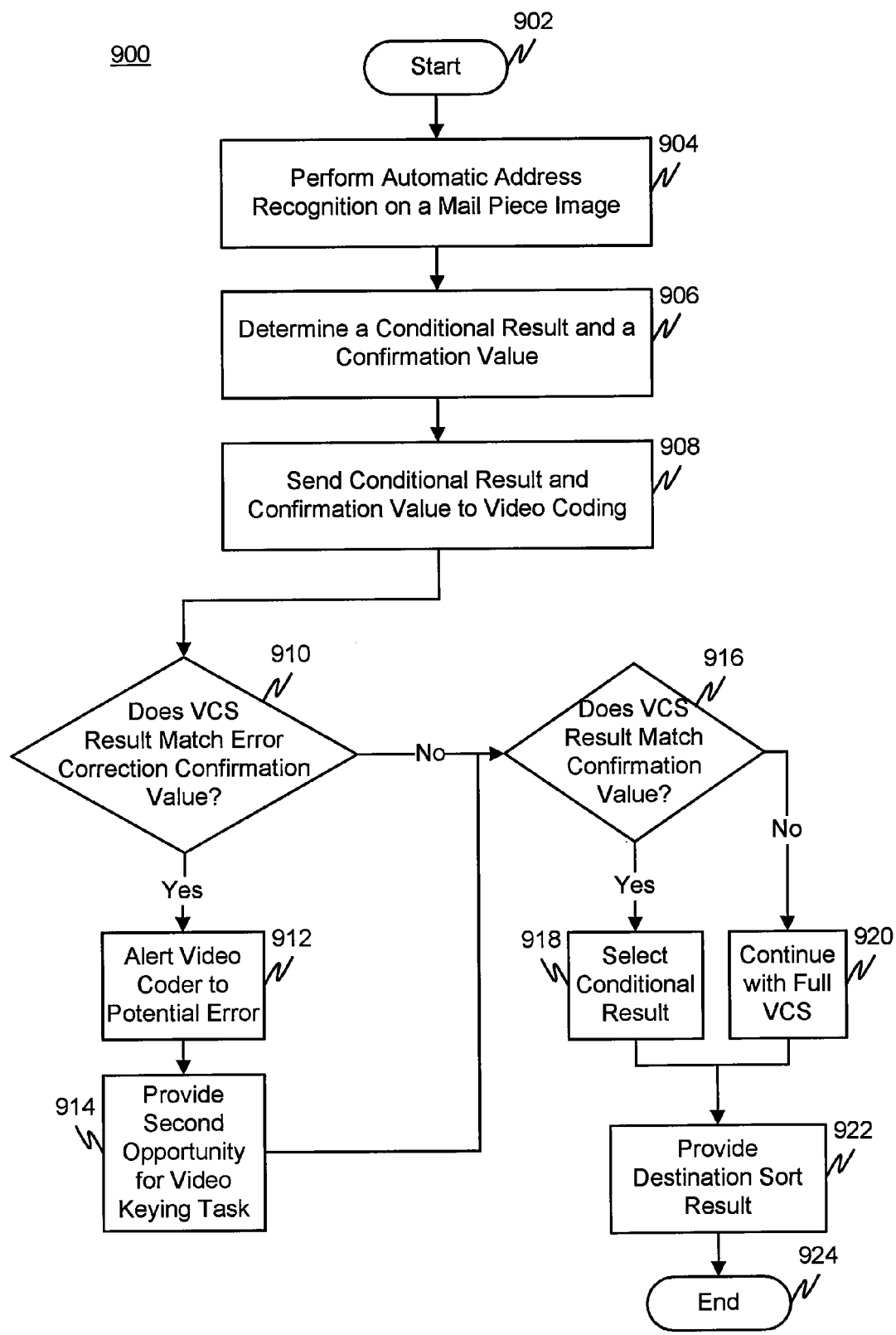
FIG. 9 provides a flowchart of an exemplary method of identifying and correcting an error in a video coding task using an automatic address recognition result.

FIG. 9 provides a flowchart 900 of an exemplary method of identifying and correcting an error in a video coding task using an automatic address recognition result in accordance with at least one embodiment. Processing begins at step 902 and continues to 904.

In step 904, automatic address recognition is attempted on a mail piece image. The automatic recognition process may result in some ambiguity or uncertainty, such as resolving a destination address to a delivery point code or a carrier walk depth. Control continues to step 906.

In step 906, a conditional result and a confirmation value associated with the conditional result are determined. For example, the conditional result may comprise a delivery point code and the confirmation value can include a 5-digit ZIP code. It should be appreciated that more than one pair of conditional results and associated confirmation values may be used. Control continues to step 908.

In step 908, the conditional result and associated confirmation value are sent to video coding for confirmation. The mail piece image can also be sent to video coding for use in confirming the conditional result. Control continues to step 910.

In step 910, a result (either in progress or final) from the video coding system (VCS) is compared to an error correction confirmation value. For example, the system may compare with a partial result in order to prevent further operator time being spent on coding a result that contains a possible error.

The error correction confirmation value may be based on a portion of one or more of the confirmation values sent to the video coding system. Alternatively, the error correction confirmation value may be based on a portion of the automatic address recognition results other than those sent to VCS for confirmation. In another alternative, the error correction confirmation values may be based on a combination of the above.

If the VCS result matches the error correction confirmation value, then control continues to step 912. If, however, the VCS result does not match the error correction confirmation value, then control continues to step 916.

In step 912, the video coding operator may optionally be alerted to the possible error in the full or partial VCS result. The alert may be audible, visual, tactile, or via other sensory stimulus and/or the like, or a combination of the above.

In step 914, the video coding operator is optionally provided with a second opportunity to perform the video coding task in light of the possible error indication by the system. Whether or not the operator performs a second video coding operation, control continues to step 916. As a supplement or alternative to step 914, the system may attempt automatically to correct the possible error if enough information is present. This auto-correct feature could be implemented by displaying one or more suggested results to a video coder, or by displaying the first few suggested characters.

In step 916, the VCS result is compared to one or more of the confirmation values. If the VCS result matches a confirmation value, then control continues to step 918, otherwise control continues to step 920.

In step 918, the conditional result is confirmed and selected as the result of the task. For example, if the video coder codes a sequence matching a 5-digit ZIP confirmation value, then a conditional result including a delivery point code associated with the confirmation value may be selected as the result. The mail piece may then be sorted according to the confirmed conditional value. It should be appreciated that sortation to depths other than delivery point may be used, such as, for example, carrier walk route. Control continues to step 922.

In step 920, the video coding sequence may continue and a result of a full video coding process may be output. Control continues to step 922.

In step 922, the destination sort result, such as delivery point code, from confirmation of automatic recognition results or of the full VCS process may be provided for mail sorting. Control continues to step 924 where the sequence ends.

It should be appreciated that steps 902-924 may be repeated in whole or in part in order to perform a contemplated mail sorting task. Further, it should be appreciated that the steps mentioned above may be performed on a single or distributed processor. Also, the processes, modules, and units described in the various figures of the embodiments above may be distributed across multiple computers or systems or may be co-located in a single processor or system.

Embodiments of the method, system and computer program product for correcting video coding errors using an automatic recognition result, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein can be used to implement embodiments of the method, system, or computer program product for correcting video coding errors using an automatic recognition result.

Furthermore, embodiments of the disclosed method, system, and computer program product for correcting video coding errors using an automatic recognition result may be readily implemented, fully or partially, in software using, for example, object or object-oriented software development environments that provide portable source code that can be used on a variety of computer platforms. Alternatively, embodiments of the disclosed method, system, and computer program product for correcting video coding errors using an automatic recognition result can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, and computer program product for correcting video coding errors using an automatic recognition result can be implemented in hardware and/or software using any known or later developed systems or structures, devices and/or software by those of ordinary skill in the applicable art from the functional description provided herein and with a general basic knowledge of the computer, mail sorting, and optical character recognition arts.

Moreover, embodiments of the disclosed method, system, and computer program product for correcting video coding errors using an automatic recognition result can be implemented in software executed on a programmed general-purpose computer, a special purpose computer, a microprocessor, or the like. Also, the correcting video coding errors using an automatic recognition result method of this invention can be implemented as a program embedded on a personal computer such as a JAVA® or CGI script, as a resource residing on a server or graphics workstation, as a routine embedded in a dedicated processing system, or the like. The method and system can also be implemented by physically incorporating the method for correcting video coding errors using an automatic recognition result into a software and/or hardware system, such as the hardware and software systems of mail sorting or automatic address recognition system equipment.

The mail piece may be a letter, a flat, or a parcel, for example.

It is, therefore, apparent that there is provided in accordance with the present invention, a method, system, and computer program product for correcting video coding errors using an automatic recognition result. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A method for sorting mail comprising:
    performing an automatic address recognition process on a digitized image of a mail piece;
    generating a plurality of conditional address recognition results and a plurality of confirmation values each associated with one of the plurality of conditional address recognition results;
    sending the digitized image, the plurality of conditional address recognition results and the plurality of confirmation values to a video coding system;
    performing a first video coding operation to obtain a first video coding result;
    detecting a possible error in the first video coding result in real time as the first video coding result is being formed in the video coding system by a video coding operator, the possible error detected using error correction information including information from the automatic address recognition process;
    indicating the possible error in real time to the video coding operator in the video coding system;
    performing a video coding operation to obtain a second video coding result; and
    arbitrating the first video coding result, the second video coding result and an automatic recognition result to determine:
        a) whether to select one of the first video coding result, the second video coding result and the automatic recognition result as an output, and
        b) whether to perform an additional video coding operation or automatic address recognition operation on the image.

2. The method of claim 1, wherein the plurality of conditional address recognition results are each associated with a confirmation value corresponding to an uncertain result from an automatic address recognition process.

3. The method of claim 1, wherein the error correction confirmation information includes automatic address recognition information having a higher confidence value than that of the conditional results.

4. The method of claim 1, wherein the video coding result is a partial result.

5. The method of claim 1, further comprising:
    outputting the video coding result with the possible error as a final result of video coding.

6. The method of claim 1, wherein sending the digitized image, the plurality of conditional address recognition results and the plurality of confirmation values to a video coding system includes using a workflow manager to communicate with the video coding system.

7. A mail sorting system comprising:
    an automatic address recognition module;
    a video coding system coupled to the automatic address recognition module, the video coding system adapted to receive a conditional result and a confirmation value generated by the automatic address recognition module;
    wherein the automatic address recognition module includes a memory having encoded thereon software instructions that when executed cause the address recognition system to perform steps comprising:
        performing an automatic address recognition process on a digitized image of a mail piece;
        generating a conditional address recognition result and a confirmation value associated with the conditional address recognition result;
        sending the conditional address recognition result and the confirmation value to the video coding system;
    wherein the video coding system includes a memory having software instructions encoded thereon that when executed cause the video coding system to perform steps comprising:
        detecting a possible error in a video coding result, the possible error detected using error correction information including information from the automatic address recognition process; and
        perceptibly indicating the possible error to a video coding operator.

8. The mail sorting system of claim 7, wherein the steps further comprise performing a video coding operation to obtain another video coding result different from the video coding result having the possible error.

9. The mail sorting system of claim 7, wherein the error correction confirmation information includes automatic address recognition information having a higher confidence value than that of the conditional result.

10. The mail sorting system of claim 7, wherein the video coding result is a partial result obtained as the video coding result is being formed by a video coding operator.

11. The mail sorting system of claim 7, wherein the steps further comprise outputting the video coding result with the possible error as a final result of video coding.

12. The mail sorting system of claim 7, wherein the steps further comprise automatically attempting to correct the error based on the automatic address recognition process and the video coding process.

13. A non-transitory computer readable medium encoded with software instructions that, when executed by a computer, cause the computer to perform a series of steps comprising:
    performing an automatic address recognition process on a digitized image of a mail piece;
    generating a conditional address recognition result and a confirmation value associated with the conditional address recognition result on the basis of an uncertain result from the automatic address recognition process;

sending the conditional address recognition result and the confirmation value to a video coding system;

responsive to the confirmation value, detecting a possible error in a video coding result; and initiating a process to correct the possible error in the video coding result.

14. The computer readable medium of claim 13, wherein the detecting step occurs in real time while the video coding result is being formed by a video coding operator.

15. The computer readable medium of claim 13, wherein the steps further comprise:

performing a video coding operation to obtain another video coding result different from the video coding result having the possible error.

16. The computer readable medium of claim 13, wherein the possible error is detected using error correction information including information from the automatic address recognition process and wherein the error correction confirmation information includes automatic address recognition information having a higher confidence value than that of the conditional result.

17. The computer readable medium of claim 13, wherein the process to correct the possible error in the video coding result includes indicating the possible error to a video coding operator.

18. The computer readable medium of claim 13, wherein the process to correct the possible error in the video coding result includes dispatching the image to a second video coding operator to obtain another video coding result.

19. The computer program product of claim 13, wherein the steps further include:

outputting the video coding result with the possible error as a final result of video coding.

20. The computer program product of claim 19, wherein the steps further comprise automatically attempting to correct the error based on the automatic address recognition process and the video coding process.

* * * * *

UNITED STATES PATENT AND TRADEMARK OFFICE
CERTIFICATE OF CORRECTION

| | | |
|---|---|---|
| PATENT NO. | : 8,005,260 B2 | Page 1 of 1 |
| APPLICATION NO. | : 12/120891 | |
| DATED | : August 23, 2011 | |
| INVENTOR(S) | : Alfred T. Rundle | |

It is certified that error appears in the above-identified patent and that said Letters Patent is hereby corrected as shown below:

Title Page,
Item (73) Assignee: Please change to --Lockheed Martin Corporation, Bethesda, MD (US)--

Signed and Sealed this
Eighteenth Day of October, 2011

David J. Kappos
*Director of the United States Patent and Trademark Office*